US007872565B2

(12) United States Patent
Fitzgibbon

(10) Patent No.: US 7,872,565 B2
(45) Date of Patent: Jan. 18, 2011

(54) PROGRAMMER PROTECTION METHOD AND APPARATUS FOR USE WITH A MOVABLE BARRIER OPERATOR

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1304 days.

(21) Appl. No.: 11/347,561

(22) Filed: Feb. 3, 2006

(65) Prior Publication Data

US 2007/0194880 A1 Aug. 23, 2007

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |
| ***G06K 19/00*** | (2006.01) |
| ***B60R 25/00*** | (2006.01) |

(52) U.S. Cl. ..................................... 340/5.28; 340/5.71

(58) Field of Classification Search ................ 340/5.28, 340/5.71

See application file for complete search history.

(56) References Cited

U.S. PATENT DOCUMENTS

| | | | | |
|---|---|---|---|---|
| 4,360,801 | A * | 11/1982 | Duhame | 340/521 |
| 4,638,433 | A | 1/1987 | Schindler | |
| 4,750,118 | A | 6/1988 | Heitschel et al. | |
| RE035,364 | E | 10/1996 | Heitschel et al. | |
| 6,026,165 | A * | 2/2000 | Marino et al. | 380/273 |
| RE036,703 | E | 5/2000 | Heitschel et al. | |
| RE037,986 | E | 2/2003 | Heitschel et al. | |
| 6,750,782 | B1 * | 6/2004 | Byun | 340/825.72 |
| 6,756,895 | B2 | 6/2004 | Study et al. | |
| 7,327,107 | B2 * | 2/2008 | Mullet et al. | 318/280 |
| 7,327,108 | B2 * | 2/2008 | Mullet et al. | 318/280 |
| 2003/0132829 | A1 * | 7/2003 | Frolov et al. | 340/5.7 |
| 2003/0153301 | A1 * | 8/2003 | Study et al. | 455/411 |
| 2006/0250216 | A1 * | 11/2006 | Gagnon | 340/5.71 |

* cited by examiner

*Primary Examiner*—Benjamin C Lee
*Assistant Examiner*—Cal Eustaquio
(74) *Attorney, Agent, or Firm*—Fitch Even Tabin & Flannery

(57) ABSTRACT

When a movable barrier operator detects (101) a predetermined state with respect to a remote transmitter learning mode, the movable barrier operator can respond by temporarily requiring (103) at least a first programmer protection duration of time to pass before permitting the movable barrier operator to respond to a remote transmitter-sourced barrier movement control signal. By one approach this first programmer protection duration of time is longer than a loss-of-signal detection duration as characterizes the movable barrier operator.

22 Claims, 3 Drawing Sheets

PROGRAMMER PROTECTION METHOD AND APPARATUS FOR USE WITH A MOVABLE BARRIER OPERATOR

TECHNICAL FIELD

This invention relates generally to movable barrier operators and more particular to movable barrier operators having a remote transmitter learning mode.

BACKGROUND

Movable barrier operators of various kinds are known in the art. Some movable barrier operators provide automated (and/or remote) control with respect to movement of a movable barrier (such as, but not limited to, a single-piece or segmented garage door, a sliding or pivoting gate, a pivoting guard arm, rolling shutters, and the like). Such control systems generally serve to provide some point of control with respect to a mechanism that itself governs, in some fashion, access to some further destination (such as, but not limited to, a garage or other parking area, a business area, a recreation or exercise area, and so forth).

For purposes of security many such movable barrier operators are configured to respond only to a previously authorized remote transmitter as versus any remote transmitter that might otherwise be able to communicate compatibly with the movable barrier operator. By one common approach an authorized remote transmitter transmits one or more codes by which the movable barrier operator can determine the authorized status of the remote transmitter. Such codes may be relatively static or may change, at least in part, pursuant to a shared algorithm (with so-called rolling codes comprising a common example of the latter).

Many movable barrier operators have a learning mode of operation and more particularly a remote transmitter learning mode of operation. When operating in this remote transmitter learning mode a movable barrier operator can learn the code that characterizes and identifies a particular corresponding remote transmitter. Thereafter, when operating in an ordinary mode of operation, the movable barrier operator can identify such a remote transmitter as being an authorized source of remote transmitter-sourced barrier movement control signals. This, in turn, permits having the movable barrier operator respond to that barrier movement control signal.

In many cases a programmer will place a movable barrier operator into this learning mode through physical manipulation of a corresponding user interface. This user interface often comprises one or more switches, buttons, or the like on the movable barrier operator itself. This location is chosen in order to make it somewhat difficult to inadvertently learn a transmitter through unplanned actuation of the learning mode. A corresponding difficulty, however, is that this location places the programmer or the programmer's equipment (such as a ladder or the like) at risk of damage if the movable barrier operator is activated. The damage can arise from a reaction to being startled by the motion or by undue engagement with the movable barrier itself and/or with moving portions of the movable barrier operator while the programmer is located near to the movable barrier operator in order to effect manipulation of that user interface.

By one prior art approach, the movable barrier operator must first lose (or otherwise cease receiving) an original remote transmitter-sourced barrier movement control signal and then receive a subsequent remote transmitter-sourced barrier movement control signal before the movable barrier operator will be permitted to respond. In the majority of cases this precaution will serve adequately to protect the programmer from the aforementioned risks, but this approach can nevertheless be supplemented further.

For example, in some cases a given movable barrier operator will be able to detect a loss-of-signal event within 0.5 seconds or less. This can lead to operational circumstances where the subsequent remote transmitter-sourced barrier movement control signal can be received very quickly after cessation of a first remote transmitter-sourced barrier movement control signal. This, in turn, can lead to a responsive action on the part of the movable barrier operator within a very brief period of time (typically less than one second) following conclusion of a learning mode action. A given programmer may be unable to move away from the movable barrier operator quickly enough under such circumstances to more fully ensure avoidance of risks such as those noted above.

BRIEF DESCRIPTION OF THE DRAWINGS

The above needs are at least partially met through provision of the programmer protection method and apparatus for use with a movable barrier operator described in the following detailed description, particularly when studied in conjunction with the drawings, wherein.

Figure 1:
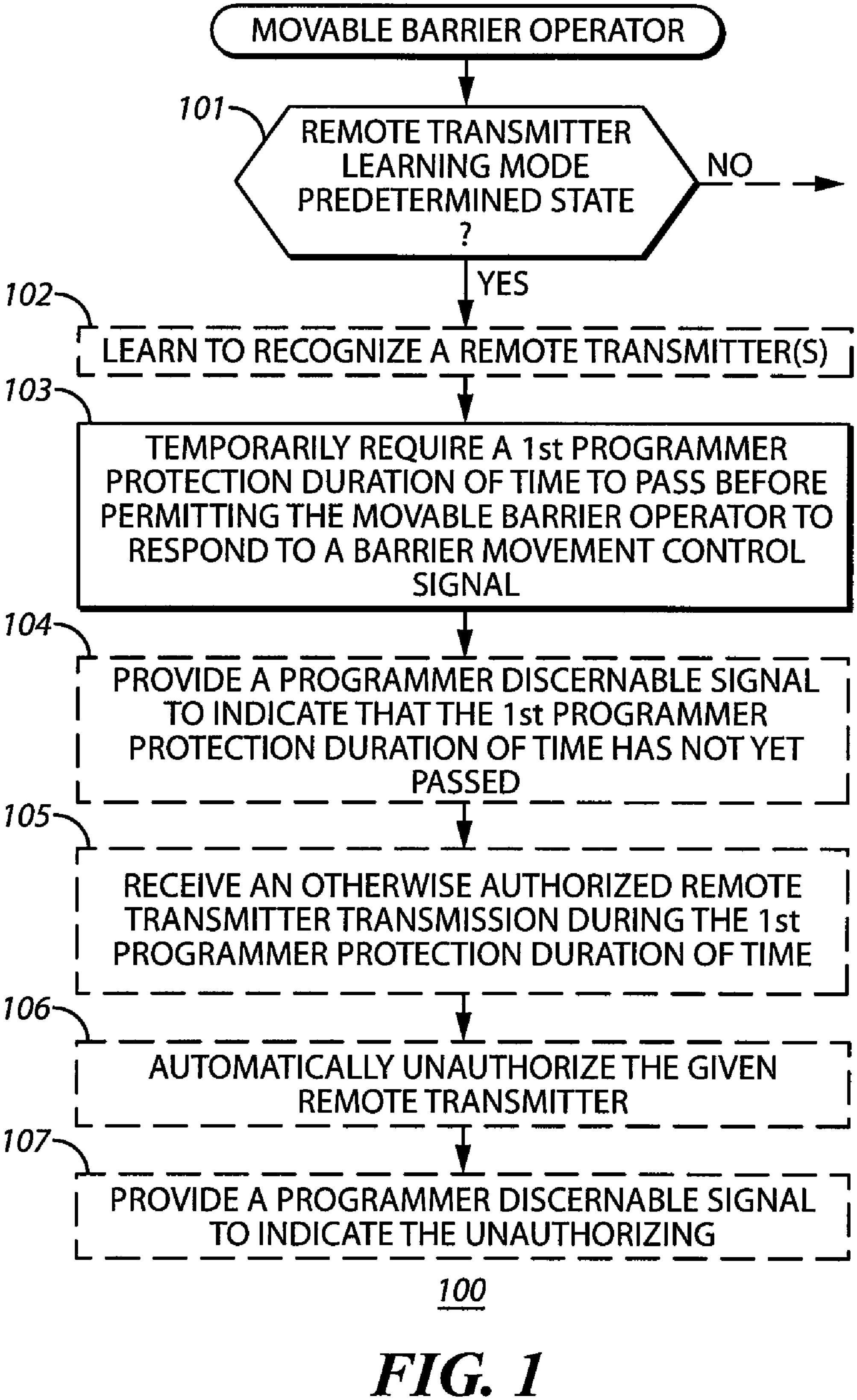
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, when a movable barrier operator detects a predetermined state with respect to a remote transmitter learning mode, the movable barrier operator can respond by temporarily requiring at least a first programmer protection duration of time to pass before permitting the movable barrier operator to respond to a remote transmitter-sourced barrier movement control signal. By one approach this first programmer protection duration of time is longer than a loss-of-signal detection duration as characterizes the movable barrier operator.

The precise nature of the predetermined state can vary with the needs and/or capabilities of a given application setting. As one example, the predetermined state can comprise initiation of the remote transmitter learning mode. By one approach, the first programmer protection duration of time can comprise a period of time that begins with a conclusion of the remote transmitter learning mode and that concludes a predetermined amount of time thereafter. By another approach, if desired, the first programmer protection duration of time can comprise a period of time that begins with a conclusion of a last received remote transmitter transmission and that concludes a predetermined amount of time thereafter.

So configured, a programmer will more likely be ensured of having a longer minimum period of time within which to remove themselves from proximity to the movable barrier operator following usage of the movable barrier operator's learning mode. The particular duration of time employed in a particular setting can be varied to suit the likely dynamics of a particular application setting.

By one approach, if desired, these teachings can also provide for receiving an otherwise authorized remote transmitter transmission from a given remote transmitter during the first programmer protection duration of time. In response to such an event, if desired, the movable barrier operator can then automatically unauthorize the given remote transmitter such that subsequent remote transmitter transmissions from the given remote transmitter will not be heeded in the absence of subsequent reauthorization of the given remote transmitter.

So configured, these teachings can additionally serve to permit a given programmer to quickly correct an unintended or mistaken authorization event for a given remote transmitter as may have occurred during a given learning session. In some cases this comprises an increase in convenience with respect to accomplishing such an event. In other cases this provides a mechanism to achieve this result where another approach may not have been otherwise available.

By yet another approach, when a movable barrier operator detects a predetermined state with respect to a remote transmitter learning mode, the movable barrier operator can respond by disabling the movable barrier operator from responding to a remote transmitter-sourced barrier movement control signal until a second event, such as physical manipulation of a corresponding user interface, occurs. Upon detecting this second event, the movable barrier operator can again be permitted to respond to remote transmitter-sourced barrier movement control signals.

These and other benefits may become clearer upon making a thorough review and study of the following detailed description. Referring now to the drawings, and in particular to FIG. 1, an illustrative process 100 suitable for use by a movable barrier operator will be presented. By this process 100 the movable barrier operator detects 101 a predetermined state with respect to a remote transmitter learning mode. The precise nature of the predetermined state can of course vary from one application setting to another. Examples include, but are not limited to, initiation of a remote transmitter learning mode (by, for example, a programmer such as an installer, homeowner, or the like), conclusion of a remote transmitter learning mode, or some other milestone event or trigger. In the absence of detecting such a state, this process 100 can simply continue with such other activities as a given designer might chose.

Upon detecting 101 this predetermined state with respect to a remote transmitter learning mode, however, this process 100 can optionally accommodate having the movable barrier operator learn 102 to recognize at least one remote transmitter during the remote transmitter learning mode. Such an accommodation can be appropriate, for example, when the predetermined state comprises initiation or activation of a remote transmitter learning mode. This learning 102 can further comprise, if desired, learning to recognize a plurality of remote transmitters during such a remote transmitter learning mode (that is, if desired, one can accommodate learning a plurality of remote transmitters during the course of a single given learning session).

Those skilled in the art will understand that there are numerous known ways by which such learning can be carried out and that other ways will likely be developed in the future. As these teachings are not particularly sensitive to the selection of any particular approach in this regard, for the sake of brevity additional elaboration regarding specific learning techniques or approaches will not be presented here.

Figure 2:
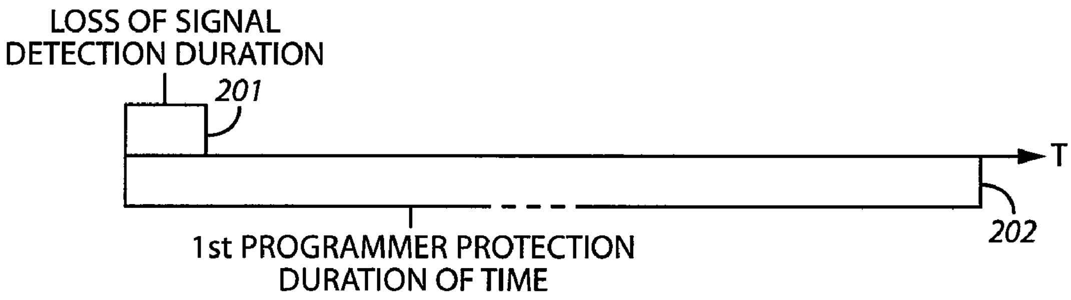
FIG. 2 comprises a timing diagram as configured in accordance with various embodiments of the invention.

In any event, in response to detecting 101 the predetermined state of the remote transmitter learning mode, this process 100 provides for temporarily requiring 103 at least a first programmer protection duration of time to pass before permitting the movable barrier operator to respond to a remote transmitter-sourced barrier movement control signal. With momentary reference to FIG. 2, this first programmer protection duration of time 202 will, by one approach, considerably exceed the duration of time 201 required or used by the movable barrier operator to effect detection of a loss-of-signal event or condition. For example, a given movable barrier operator might be characterized by a loss-of-signal detection duration 201 of about 0.5 seconds while a suitable first programmer protection duration of time 202 might be 30 seconds, 60 seconds, or the like.

This first programmer protection duration of time can comprise, if desired, a duration of time that begins with a conclusion of the remote transmitter learning mode and that concludes a predetermined amount of time (such as, for example, the aforementioned 30 seconds) thereafter. By another approach (and again as desired) this first programmer protection duration of time can comprise a period of time that begins with a conclusion of a last received remote transmitter transmission and concludes a predetermined amount of time thereafter. It would also be possible to employ both of these possible approaches and/or to tether the first programmer protection duration of time to some other event, state, or condition of interest if desired.

So configured, these teachings can aid in protecting a programmer from untoward interactions with the movable barrier operator and/or a corresponding movable barrier. In particular, a transmission from a recently learned remote transmitter are largely prevented from causing a responsive movement when such a transmission occurs at a time that is perhaps more likely to correspond to when the programmer is physically proximal to the movable barrier operator itself as often ordinarily occurs during a remote transmitter learning process.

Figure 3:
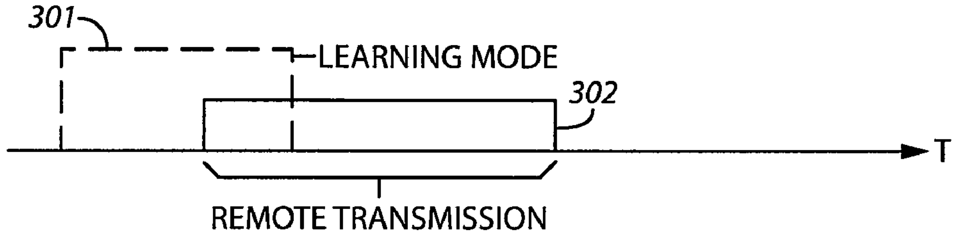
FIG. 3 comprises a timing diagram as configured in accordance with various embodiments of the invention.

As one illustrative example, and referring now to FIG. 3, a remote transmission 302 that begins during a learning mode 301 (in order to facilitate having the movable barrier operator learn the code, for example, of a particular remote transmitter) and that then extends in time beyond the learning mode 301 will not be acted upon by the movable barrier operator. To this extent, of course, these teachings provide a same result as one achieves with at least some prior art techniques where the latter require reception of a subsequent transmission following a learning event before a corresponding movable barrier operator response is permitted.

Figure 4:
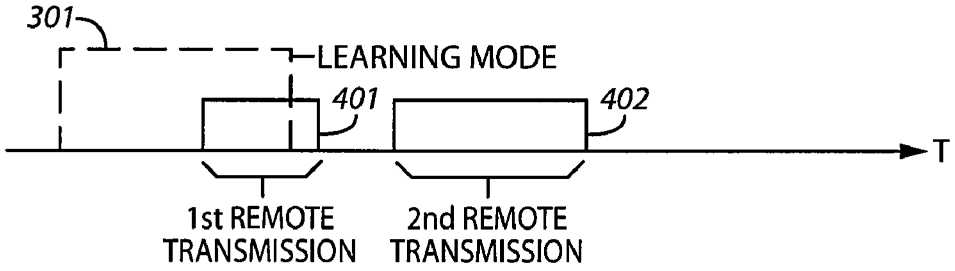
FIG. 4 comprises a timing diagram as configured in accordance with various embodiments of the invention.

As another illustrative example, however, and referring now to FIG. 4, these teachings will also permit such a response in a case where a second remote retransmission 402 is received following a first remote transmission 401 within a period of time that is less than the first programmer protection duration of time described above. By present prior art practice, this second remote transmission 402 can cause operation of the movable barrier operator so long as the interval between the first and second remote transmissions exceeds the loss of signal detection duration that characterizes this particular movable barrier operator. As already noted, this loss of signal detection duration can be relatively short; short enough, in some cases, to permit, for example, a clumsily asserted attempt at a single transmission by a programmer that results instead in two transmissions in rapid succession to cause the second transmission to instigate a responsive operation by the movable barrier operator. The teachings set forth herein, however, aid in avoiding such a result under such circumstances as such a second transmission is effectively ignored unless received past the first programmer protection duration of time.

Referring again to FIG. 1, if desired, this process 100 can optionally further provide 104 a programmer discernable signal as an indication of when the first programmer protection duration of time has not yet passed. Such a signal can comprise, for example, one or more of an audible signal, a visual signal, a haptic signal, or the like. A programmer, in turn, could rely upon such a signal to intuit when the movable barrier operator is, and is not, able to respond to a remote transmitter transmission with corresponding action and movement.

If desired, this process 100 can also accommodate using the first programmer protection duration of time to de-authorize a previously authorized remote transmitter. For example, this process 100 can provide for detecting reception 105 of an otherwise authorized remote transmitter transmission from a given remote transmitter during the first programmer protection duration of time and to then automatically unauthorize 106 that given remote transmitter such that subsequent remote transmitter transmissions from that remote transmitter will not be heeded in the absence of subsequent reauthorization of the given remote transmitter. By one approach, if desired, this automatic unauthorization can comprise preparing to unauthorized the given remote transmitter and then, upon detecting subsequent initiation of the remote transmitter learning mode, responsively completing the unauthorization of this remote transmitter.

This can be helpful and useful, for example, when a programmer has a plurality of remote transmitters and inadvertently causes the movable barrier operator to learn a particular remote transmitter that, in fact, is not intended for authorized use with that movable barrier operator. At present, such deauthorization can be cumbersome or may not be a supported function by any means. This optional feature provides a relatively simple, effective, and intuitive mechanism by which such an action can be accomplished. If desired, this process 100 can further accommodate providing 107 a programmer discernable signal (such as any of those previously noted above) to indicate when such unauthorizing occurs or is about to occur).

Figure 5:
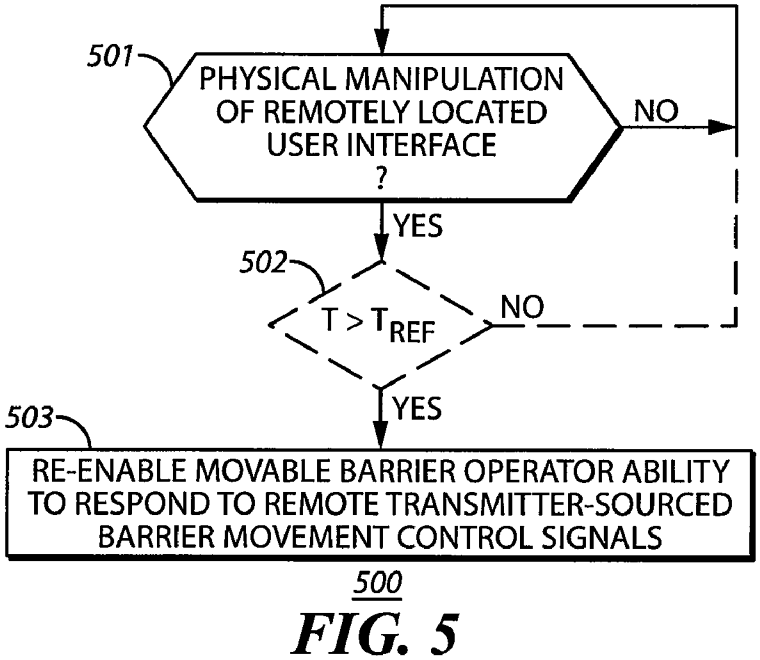
FIG. 5 comprises a flow diagram as configured in accordance with various embodiments of the invention.

If desired, an over-ride mechanism 500 can be provided to supplement (or to substitute for) the above described processes. As is already described above, a movable barrier operator can be configured to respond to detection of a predetermined state of interest as corresponds to a remote transmitter learning mode. With reference to FIG. 5, the movable barrier operator can then monitor to detect 501 if and when physical manipulation of a remotely located user interface occurs. Such a user interface can comprise, for example, a wall-mounted push button switch or the like.

The distance between such a user interface and the movable barrier operator can of course vary with the particular circumstances of a given application setting but will typically be a distance that is at least sufficiently remote so as to require the programmer to remove themselves from physical proximity to the movable barrier operator in order to effect the required physical manipulation of the user interface.

Upon detecting 501 such a physical manipulation, this process 500 can then provide for re-enabling the ability of the movable barrier operator to respond to remote transmitter-sourced barrier movement control signals. In the case where this process 500 is used in conjunction with the previously described process 100, this re-enablement can occur notwithstanding that the first programmer protection duration of time has not yet passed.

If desired, such re-enablement can be further conditioned by a preceding requirement 502 that at least predetermined threshold amount of time have passed. This predetermined threshold amount of time may comprise, for example, a second programmer protection duration of time that may, for example, be less than the first programmer protection duration of time discussed above. For example, the first programmer protection duration of time could be 60 seconds and the second programmer protection duration of time could be 30 seconds.

Figure 6:
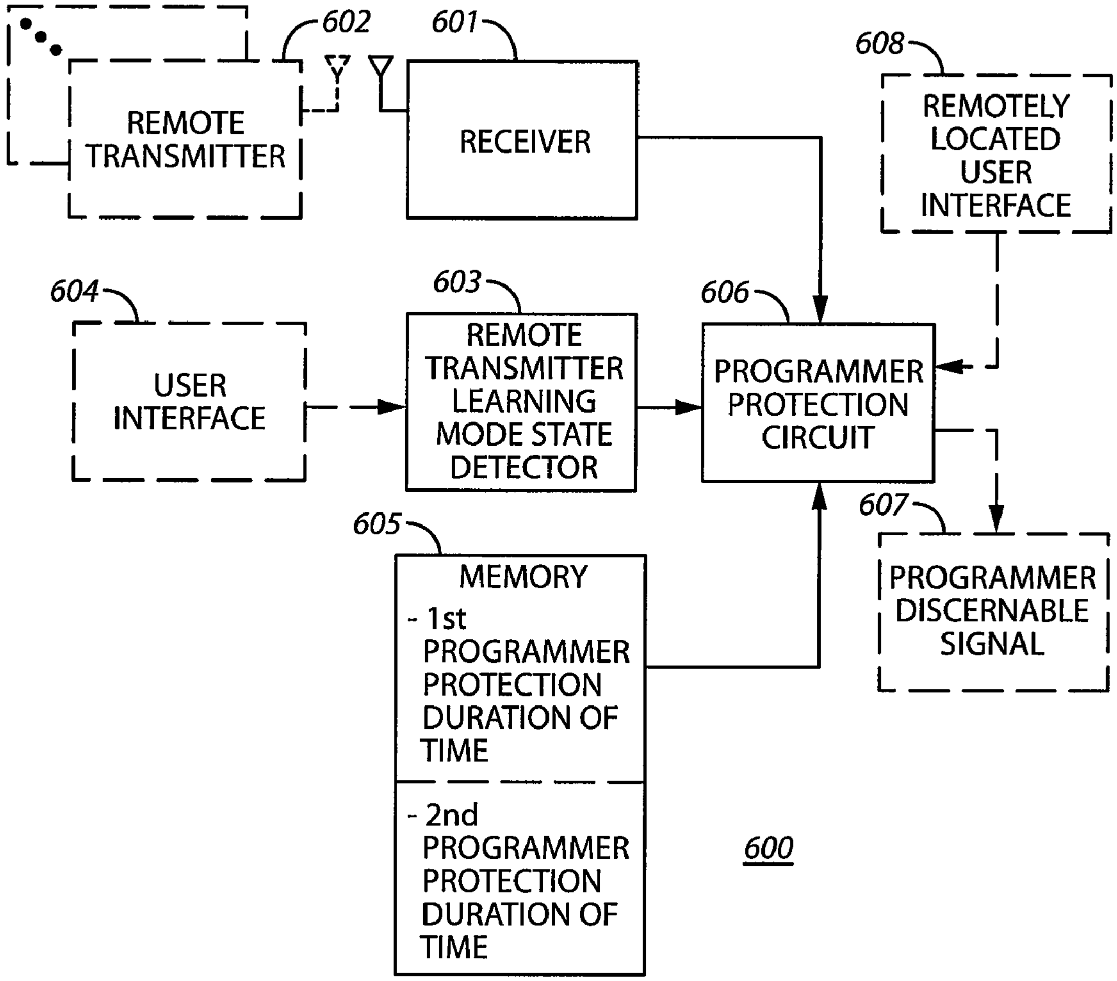
FIG. 6 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 6, an illustrative approach to such a platform will now be provided.

In this illustrative example a movable barrier operator 600 comprises a receiver 601 that is configured and arranged in accordance with prior art knowledge to operate compatibly with one or more wireless remote transmitters 602. The latter may comprise, for example, handheld devices or a sunshade-mounted device that a person can use to cause a movable barrier, such as a garage door, to move in a desired direction. This movable barrier operator 600 also comprises a remote transmitter learning mode state detector 603 and a memory 605.

The remote transmitter learning mode state detector 603 serves to detect the desired predetermined state of a remote transmitter learning mode as described above. By one approach, such a detector 603 can be operably coupled to (or rendered otherwise responsive to) a user interface 604 that serves to facilitate, for example, initiation of a remote transmitter learning mode.

The memory 605, by one approach, has stored therein a first programmer protection duration of time as described above. As already described, this first programmer protection duration of time may represent a duration of time (such as but not limited to a duration of time that is at least 30 seconds in length) that is longer than a loss-of-signal detection duration that may otherwise characterize the operation of the movable barrier operator 600. When this platform serves to support the optional remote user interface interaction process 500 described above, this memory 605 can also have stored therein the aforementioned second programmer protection duration of time.

A programmer protection circuit 606 operably couples to the receiver 601, the remote transmitter learning mode state detector 603, and the memory 605. By one approach this programmer protection circuit is configured and arranged to temporarily require at least the first programmer protection duration of time to pass before permitting the movable barrier operator to respond to a remote transmitter-sourced barrier movement control signal following detection of the aforementioned predetermined state as corresponds to the remote transmitter learning mode of operation. For example, by one approach, this can comprise temporarily requiring at least the first programmer protection duration of time to pass beginning with a conclusion of the remote transmitter learning mode of operation. As another example, by another approach, this can comprise temporarily requiring at least the first programmer protection duration of time to pass beginning with a conclusion of a last received remote transmitter transmission.

If desired, this programmer protection circuit 606 can be further configured and arranged to provide for automatically unauthorizing a given remote transmitter upon receiving an otherwise authorized remote transmitter transmission from a given remote transmitter during the first programmer protection duration of time. This, in turn, would cause the movable barrier operator to not heed subsequent remote transmitter transmissions from that remote transmitter unless and until that remote transmitter were reauthorized. As noted above, such unauthorizing can comprise, if desired, initially preparing to unauthorize the remote transmitter and then completing such unauthorization in response to detecting, for example, initiation of the remote transmitter learning mode.

If desired, this movable barrier operator 600 can also optionally comprise a programmer discernable signal 607. This can comprise an audible signal, a visual, and/or a haptic signal as may best suit the needs and requirements of a given application setting. Such a signal can be used, for example, to indicate when the first programmer protection duration of time has not yet passed and/or to indicate one or more steps or states during the aforementioned unauthorization steps, to note but a few useful examples.

As noted above, this platform 600 may also operably couple to a remotely located user interface 608 such as, but not limited to, a wall-mounted switch that is located, for example, near a door leading from a garage into a connected residence. It is the physical manipulation of such a remotely located user interface 608 that can serve as a trigger for the above-described corresponding process 500.

Those skilled in the art will recognize and understand that such an apparatus 600 may be comprised of a plurality of physically distinct elements as is suggested by the illustration shown in FIG. 6. It is also possible, however, to view this illustration as comprising a logical view, in which case one or more of these elements can be enabled and realized via a shared platform. It will also be understood that such a shared platform may comprise a wholly or at least partially programmable platform as are known in the art.

Those skilled in the art will appreciate the added protection that may be achieved via these teachings. It will also be appreciated that these teachings may be further leveraged to increase the capabilities and functionality of a given movable barrier operator. These teachings are also readily implemented using readily available technology in a highly cost effective manner.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A method comprising:

at a movable barrier operator for operating a barrier responsive to a barrier movement control signal from a remote transmitter:

detecting a predetermined state with respect to a remote transmitter learning mode;

in response to detecting the predetermined state of the remote transmitter learning mode, requiring at least a first programmer protection duration of time to pass before permitting the movable barrier operator to respond to a remote transmitter-sourced barrier movement control signal to operate the barrier, wherein the first programmer protection duration of time is longer than a loss-of-signal detection duration for the movable barrier operator, and wherein the first programmer protection duration of time begins in response to a conclusion of the remote transmitter learning mode.

2. The method of claim 1 wherein requiring at least a first programmer protection duration of time to pass before permitting the movable barrier operator to respond to a remote transmitter-sourced barrier movement control signal further comprises temporarily requiring at least a first programmer protection duration of time to pass before permitting the movable barrier operator to respond to a barrier movement control signal from any source.

3. The method of claim 1 wherein the predetermined state comprises initiation of the remote transmitter learning mode and wherein the method further comprises:

learning to recognize at least one remote transmitter during the remote transmitter learning mode.

4. The method of claim 3 wherein learning to recognize at least one remote transmitter during the remote transmitter learning mode comprises learning to recognize a plurality of remote transmitters during the remote transmitter learning mode.

5. The method of claim 1 wherein the first programmer protection duration of time comprises a period of time that begins with a conclusion of the remote transmitter learning mode and concludes a predetermined amount of time thereafter.

6. The method of claim 5 wherein the predetermined amount of time comprises at least 30 seconds.

7. The method of claim 1 wherein the first programmer protection duration of time comprises a period of time that begins in response to a conclusion of a last received remote transmitter transmission received during the remote transmitter learning mode and concludes a predetermined amount of time thereafter.

8. The method of claim 7 wherein the predetermined amount of time comprises at least 30 seconds.

9. A method comprising for operating a barrier responsive to a barrier movement control signal from a remote transmitter:

at a movable barrier operator:

detecting a predetermined state with respect to a remote transmitter learning mode;

in response to detecting the predetermined state of the remote transmitter learning mode, temporarily requiring at least a first programmer protection duration of time to pass before permitting the movable barrier operator to respond to a remote transmitter-sourced barrier movement control signal to operate the barrier, wherein the first programmer protection duration of time is longer than a loss-of-signal detection duration as characterizes the movable barrier operator, and wherein the first programmer protection duration of time begins in response to a conclusion of the remote transmitter learning mode;

authorizing the remote transmitter;

receiving a transmission from the remote transmitter during the first programmer protection duration of time;

automatically unauthorizing the remote transmitter such that subsequent remote transmitter transmissions from the remote transmitter will not be heeded without a subsequent reauthorization of the remote transmitter by the movable barrier operator.

10. The method of claim 9 further comprising:

providing a programmer discernable signal to indicate the unauthorizing.

11. The method of claim 9 wherein automatically unauthorizing further comprises:

preparing to unauthorize the remote transmitter;

detecting initiation of the remote transmitter learning mode and completing unauthorization of the remote transmitter in response thereto.

12. The method of claim 1 further comprising:

providing a programmer discernable signal as an indication of when the first programmer protection duration of time has not yet passed.

13. The method of claim 12 wherein the programmer discernable signal is at least one of:

an audible signal;

a visual signal;

a haptic signal.

14. The method of claim 1 further comprising:

detecting physical manipulation of a user interface that is remotely located with respect to the movable barrier operator;

in response to detecting the physical manipulation, re-enabling the movable barrier operator's ability to respond to a remote transmitter-sourced barrier movement control signal notwithstanding that the first programmer protection duration of time has not yet passed.

15. The method of claim 14 wherein re-enabling the movable barrier operator's ability to respond to a remote transmitter-sourced barrier movement control signal notwithstanding that the first programmer protection duration of time has not yet passed further comprises re-enabling the movable barrier operator's ability to respond to a remote transmitter-sourced barrier movement control signal notwithstanding that the first programmer protection duration of time has not yet passed provided that at least a second programmer protection duration of time has passed.

16. The method of claim 15 wherein the second programmer protection duration of time is shorter than the first programmer protection duration of time.

17. A method comprising:

entering a movable barrier operator learning mode for learning a remote transmitter for controlling a moveable barrier;

requiring at least a first programmer protection duration of time to pass before permitting the movable barrier operator to respond to a remote transmitter-sourced barrier movement control signal to operate a barrier;

wherein the first programmer protection duration of time is longer than a loss-of-signal detection duration for the movable barrier operator, and the first programmer protection duration of time begins in response to a conclusion of the remote transmitter learning mode.

18. The method of claim 17 wherein the first programmer protection duration of time comprises a period of time that begins in response to the conclusion of the remote transmitter learning mode and concludes a predetermined amount of time thereafter.

19. The method of claim 17 wherein the first programmer protection duration of time comprises a period of time that begins in response to a conclusion of a last received remote transmitter transmission received during the remote transmitter learning mode and ending after the conclusion of the remoter transmitter learning mode.

20. A method comprising:

a movable barrier operator entering a movable barrier operator learning mode for learning a remote transmitter for controlling a moveable barrier operator;

ignoring transmissions received by the movable barrier operator during the movable barrier operator's being in the movable barrier operator learning mode;

ignoring transmissions received by the movable barrier operator during a programmer protection duration beginning as a result of the movable barrier operator learning mode and being in effect after conclusion of the movable barrier operator learning mode, wherein the programmer protection duration of time is longer than a loss-of-signal detection duration for the movable barrier operator;

operating the movable barrier operator in response to receiving remote transmitter sourced transmissions after expiration of the programmer protection duration.

21. The method of claim 20 further comprising beginning the programmer protection duration in response to conclusion of the remote transmitter learning mode and concluding the programmer protection duration an amount of time thereafter.

22. The method of claim 21 further comprising beginning the programmer protection duration in response to a conclusion of a last received remote transmitter transmission received during the movable barrier operator learning mode and ending after conclusion of the movable barrier operator learning mode.

* * * * *